July 21, 1970  A. H. NEUGEBAUER  3,521,408
TIRE SIDEWALL GRINDING METHOD AND APPARATUS
Filed Jan. 17, 1968  3 Sheets-Sheet 1

INVENTOR.
ALFRED H. NEUGEBAUER
BY
ATTORNEY

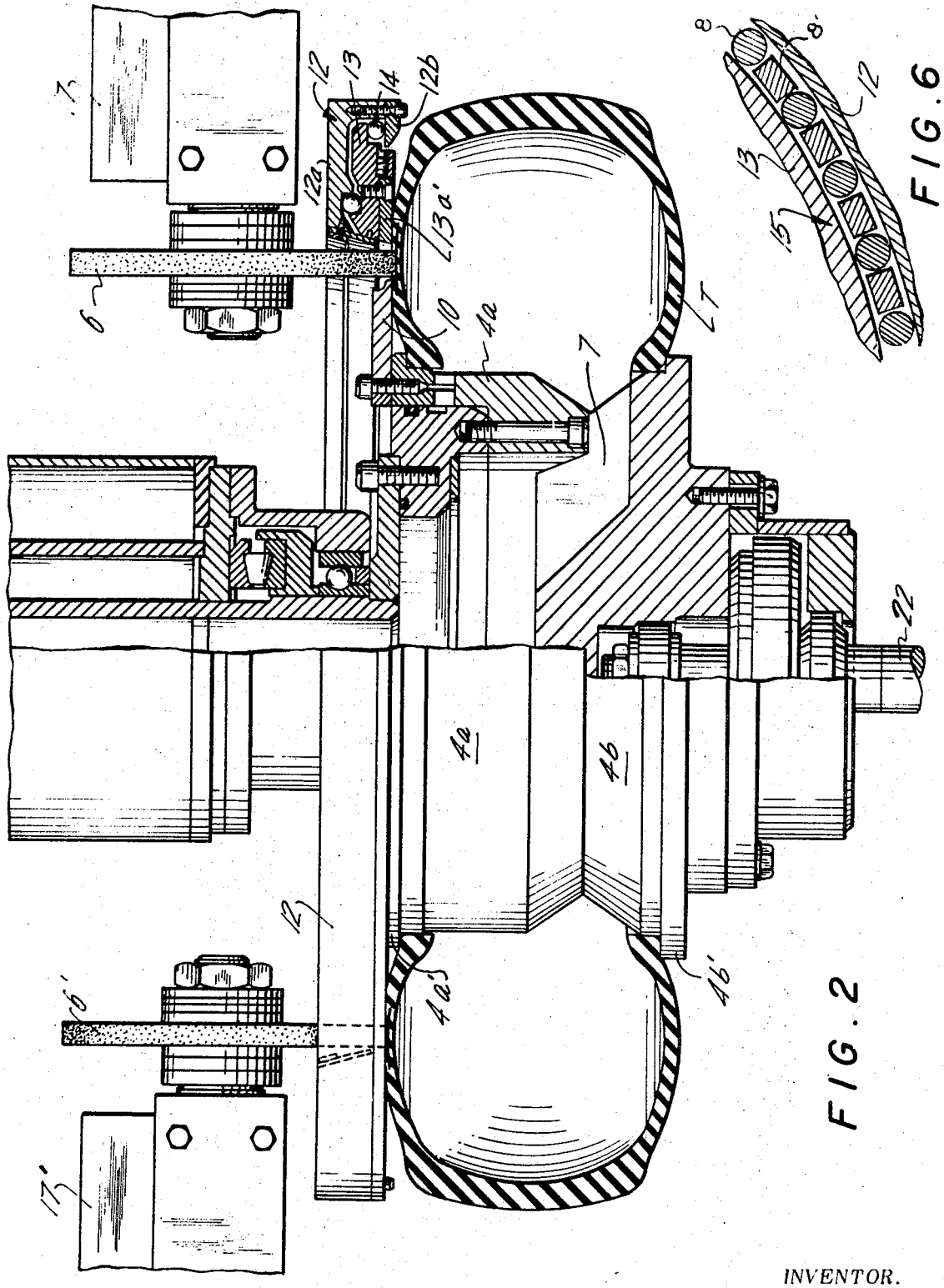

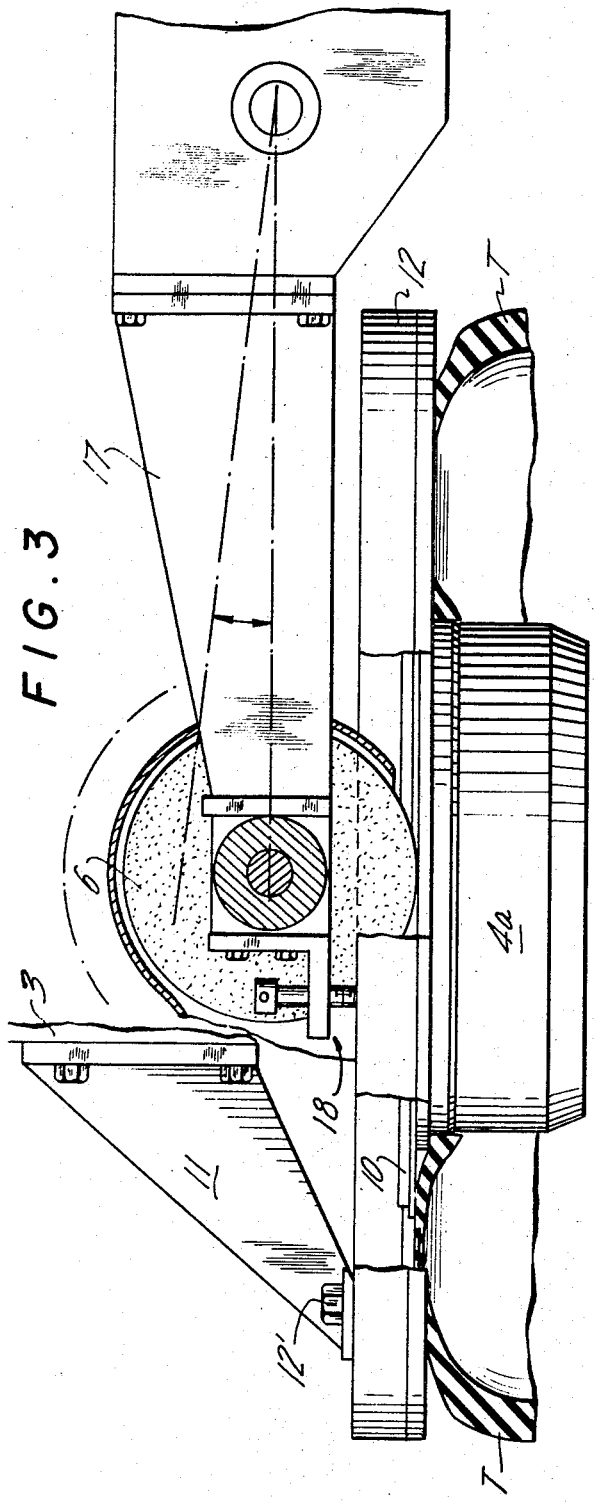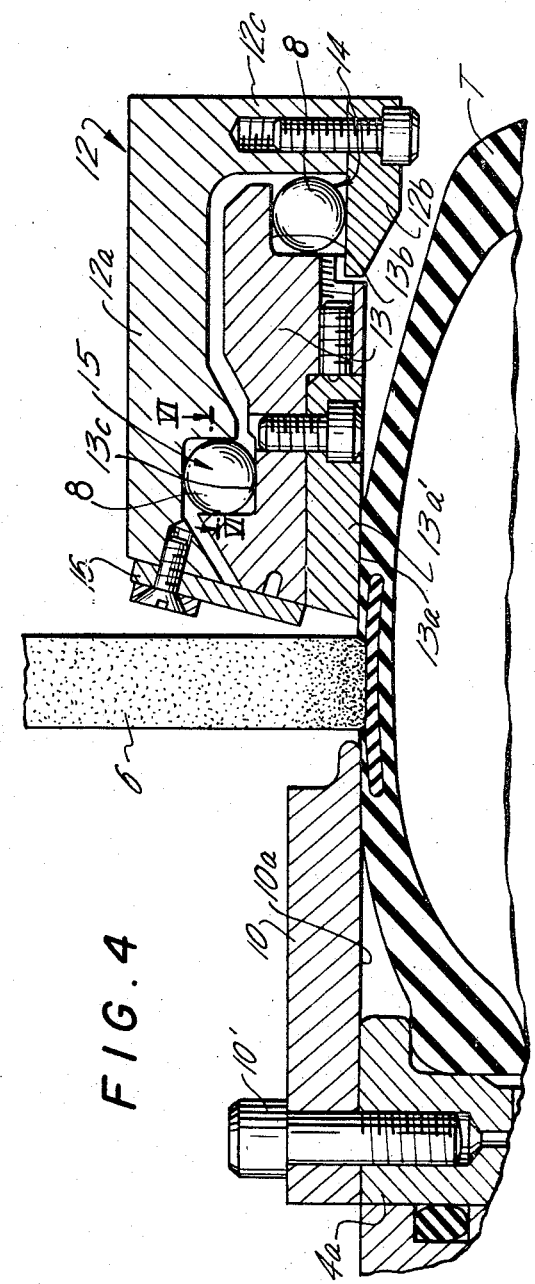

United States Patent Office 3,521,408
Patented July 21, 1970

3,521,408
TIRE SIDEWALL GRINDING METHOD AND APPARATUS
Alfred H. Neugebauer, Kitchener, Ontario, Canada, assignor to Uniroyal, Inc., New York, N.Y., a corporation of New Jersey
Filed Jan. 17, 1968, Ser. No. 698,456
Int. Cl. B24b 5/44, 7/04
U.S. Cl. 51—106                             21 Claims

ABSTRACT OF THE DISCLOSURE

During the grinding of a tire sidewall the surface to be ground is maintained in a substantially flat condition in a plane generally perpendicular to the axis of rotation of the tire. To accomplish this the portions of the tire sidewall on opposite sides of the surface to be ground are maintained pressed against a pair of spaced substantially coplanar rigid surfaces located substantially in said generally perpendicular plane.

This invention relates to the process and apparatus for abrading the sidewall of a tire casing and particularly for grinding annular stripes of contrasting color in the sidewall of a pneumatic tire casing.

A "white sidewall" tire is made up in the same manner as the black sidewall tire, except that a strip of white rubber is interlaid at that portion of the sidewall where the stripe is to be located in the finished tire. Normally, a thin sheet or layer of black rubber is subsequently placed over the exposed surface of the white rubber strip prior to vulcanization. In order to produce a recessed white stripe having uniform circular edges a portion of the overlying black rubber strip is ground away together with some of the underlying white rubber.

Heretofore known techniques and apparatus for abrading the sidewalls of tires have in general been subject to severe limitations. The white (and more recently red) rubber required for forming the stripe or stripes is substantially more expensive than the remaining black sidewall rubber. Due to dimensional variations and the inherent resilient characteristics of rubber, particularly when in the form of an inflated pneumatic tire, it has in the past been difficult to precisely control the depth and accuracy of grind. It is desirable, of course, that in a tire having a recessed stripe and contrasting color the recess be of a uniform depth. Because tires, even of the same nominal size, are not always of uniform dimensions, with dimensions varying from tire to tire and even in different portions of the same tire it has with known methods and apparatus been virtually impossible to accurately set the grind depth, on a mass production basis, for uniform sidewall grinding. It has therefore been necessary to provide relatively thick layers of white, or red, rubber inlays so as to provide a color safety factor in order to compensate for the depth imprecision in the grinding operation.

Furthermore, as a result of the aforesaid inherent properties of pneumatic tires and the materials they are made of, the heretofore known apparatus for abrading the sidewalls of such tires have been limited in speed of operation due to the vibrations of the grinding wheel at higher speeds which were found to result in non-uniformly ground surfaces.

It is, therefore, an object of the present invention to provide a new and improved process of, and apparatus for, precisely abrading the sidewalls of tires, free of the limitations of heretofore known processes and apparatus of this type.

A further object of the invention is to provide an improved apparatus for grinding a recessed stripe of contrasting color and uniform depth in the sidewall of a tire.

Another object of the invention is to provide an improved method and apparatus for more rapidly grinding a recessed stripe of uniform depth in the sidewall of a tire.

A concomitant object of the invention is to provide an improved method and apparatus having the above characteristics and which will permit the use of lesser quantities of the more expensive white, red, or other colored rubber sidewall inlaid stock.

The present invention provides a means by which the surface of the tire adjacent the stripe is positioned in a uniform manner and in a fixed plane, regardless of non-uniformities in the tire, and the grinding depth determined with respect to such plane in order to produce the desired uniform recess depth in the rubber of contrasting color which forms the stripe.

More particularly, in accordance with one embodiment of the present invention, the apparatus for precisely abrading the sidewalls of tires comprises a pair of concentric ring members of different radii and having surfaces located in a common plane perpendicular to the normal axis of the tire to be ground. The rings are arranged so as to define between themselves an annular space which is in registry with the portion of the tire sidewall to be ground when the tire is inflated and pressed against the ring surfaces.

For a better understanding of the present invention, together with other and further objects thereof, reference is had to the following description taken in conjunction with the accompanying drawings, in which:

FIG. 2 is an enlarged partly sectional view of a portion of the structure illustrated in FIG. 1, showing a tire positioned thereon;

FIG. 3 is a side elevational partly sectional, partial view of the structure illustrated in FIG. 2, taken in the direction of the arrows III—III;

FIG. 4 is an enlarged sectional view of a portion of the grinding wheel and double ring sidewall support structure illustrated in FIG. 2;

FIG. 6 is an enlarged partial view taken in the direction of the arrows VI—VI, FIG. 4, with the clearances greatly exaggerated.

Figure 1:
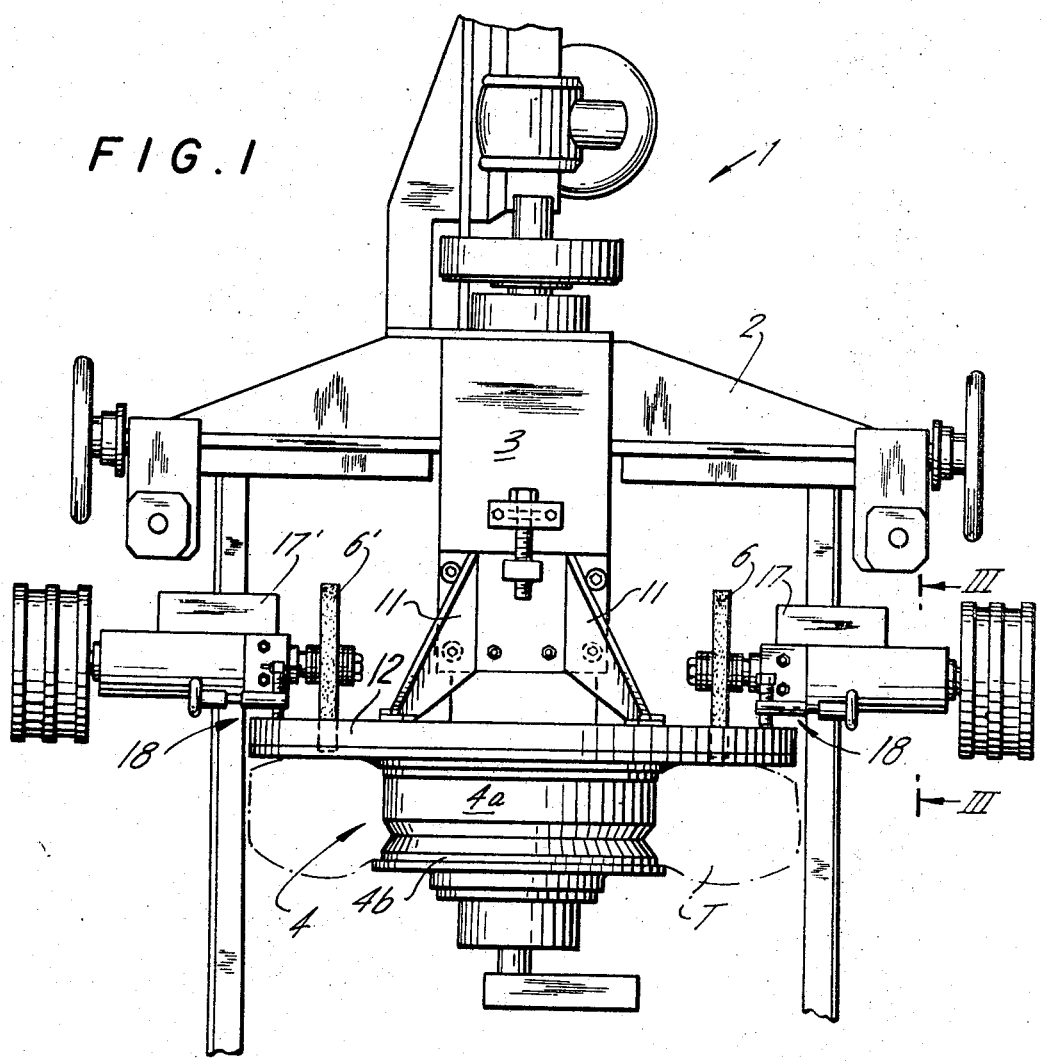
FIG. 1 is a front elevational partial view of the sidewall abrading apparatus constructed in accordance with the present invention.

As used herein, and in the subjoined claims, the term "normal axis" of a tire, means the axis normal to the planes of the tire beads and on which the tire rotates when in use on a vehicle.

The basic apparatus illustrated, and with respect to which the present invention represents an improvement is of a well known type utilized in the rubber industry such as, for example, the grinding apparatus shown in United States Pat. No. 3,128,579, issued Apr. 14, 1964 to N. T. Kehoe et al. The foregoing patent describes mechanism by which a lower hub part may be initially raised, to lift therewith a tire positioned thereon, into engagement with an upper hub part so that the beads of the tire will be securely positioned between the hub parts; mechanism for inflating a tire thusly positioned between the hub parts; mechanism for rotating the hub parts together with the tire mounted thereon; a pair of grinding wheels and mechanism for rotating the same; mechanism for moving the grinding wheels radially with respect to the axis of rotation of the tire for adjusting the radial position of the grinding wheel with respect to the surface to be ground; and mechanism for vertically moving the grinding wheels, i.e., in direction parallel to the axis of rotation of the tire for adjusting the depth of grind desired.

United States Pat. No. 3,290,831, issued Dec. 13, 1966 to A. J. Laube shows a similar apparatus provided with an inner ring, designated in that patent by reference numeral 54, for supporting a portion of the tire sidewall inwardly, only, of the stripe to be ground. It will be seen, therefore, that the prior art devices failed to provide substantially coplanar support of portions of the sidewall surface located on opposite sides of the region to be ground so as to maintain the region to be ground in a known plane during grinding as is taught by the present invention.

In accordance with the present invention and referring to the drawings and more particularly to FIG. 1, the grinding apparatus 1 comprises a frame means 2, having a central supporting portion 3, which rotatably supports upper and lower chuck parts 4a and 4b, respectively, of a chuck 4. Chuck parts 4a and 4b are rotatable about a vertical axis which coincides with the normal axis, i.e., the axis of rotation of a tire T positioned thereon. The lower chuck part 4b is rotatably mounted by thrust bearings on the upper end of a piston rod 22 of a hydraulic hoist (not shown) which is supported by the frame 2. Piston 22 is arranged to move the lower chuck part 4b between a lower loading position (not shown) and an upper grinding position, shown in FIGS. 1 and 2. In the illustrated embodiment, upper chuck part 4a is vertically fixed while being connected to a hollow shaft rotatably mounted in the central supporting portion 3. The latter shaft is hollow so as to provide an air passage communicating with openings 7 in lower chuck part 4b for inflating the tire T; such tire, when inflated, assuming the position illustrated in the drawings.

Referring now more particularly to FIG. 2, the upper and lower parts 4a and 4b of the chuck 4 are shown in engaged condition suitable for maintaining the beads of the tire T mounted thereon in the desired operative relation to a pair of diametrically opposed grinding wheels 6, 6' supported on identical pivotable arms 17, 17' respectively (FIG. 3) for rotation about axes normal to the axis of rotation of the tire. The chuck parts 4a and 4b are, as aforesaid, suitably mounted to provide full rotation of the tire T. When the chuck parts 4a and 4b are together (FIG. 2), the beads of the tire T are held securely by a lower supporting flange 4b' and an upper supporting flange 4a' which extend horizontally outwardly from the respective chuck parts.

The locating means for locating the surface of the tire sidewall which is to be ground are provided in the form of an inner and an outer ring member 10 and 13, respectively (FIG. 4). Inner ring member 10 is preferably of annular shape and preferably has a planar side face 10a facing the tire sidewall to be ground and disposed in a given plane which is normal to the axis of rotation of the tire T. Ring member 10 may be fixed to the upper surface of upper chuck part 4a by any suitable means such as bolts 10'. Inner ring member 10 is concentric with and extends outwardly from the chuck 4 a distance sufficient to bring it radially near to but terminating inwardly of the inner edge of the sidewall portion which is to be ground. Thus, where the sidewall portion to be ground is in the form of an annular stripe, the inner ring member has a radius at its outer periphery which is slightly less than but closely approximates the radius of the inner edge of the stripe to be ground.

Suspended from and fixed to the main body portion 3 are outwardly extending brackets 11 which, in turn support an annular outer frame member 12 having a generally L-shaped cross section. Frame member 12 surrounds the inner ring member 10 and is concentric therewith.

As illustrated in FIG. 4 the annular frame member 12 which is rigid with and forms part of the frame means 2, is preferably in the form of a downwardly open L-shaped annular support 12a, 12c which defines together with a removable but rigidly connectable annular member 12b an annular space in which there is freely rotatably received an outer ring member 13 also constituting part of said locating means. Outer ring member 13 preferably includes a replaceable annular insert 13a' having a bottom face 13a disposed substantially in the plane of the bottom face 10a of inner ring member 10, i.e., in a plane perpendicular to the normal axis of the tire T. Annular member 12b extends only part of the way radially inwardly so as to leave a substantial portion of the planar surface 13a of outer ring member 13 exposed for engagement with the tire sidewall.

Outer ring member 13 is also provided with a pair of annular grooves 13b and 13c (FIG. 4) on opposite side faces thereof, respectively. Groove 13b, which is open downwardly, is located radially outwardly of the upwardly open groove 13c. A bearing means is provided for freely rotatably supporting outer ring member 13 in the aforesaid space defined by annular frame member 12. This bearing means may be in the form of a lower outer bearing assembly 14 having circumferentially spaced ball bearings 8 disposed in the annular space formed between the walls of groove 13b and the opposing walls of portions 12b and 12c respectively, and an upper bearing assembly 15 having circumferentially spaced ball bearings 8 disposed in the space formed by the walls of groove 13c and a pair of corresponding oppositely directed walls provided at the interior of portion 12a. The ball bearings 8 of the assemblies 14 and 15 may be maintained spaced from each other by cylindrical rollers 8' (FIG. 6) disposed therebetween with their axes lying substantially on the circle passing throughout the axes of the spaced ball bearings. The above describes how outer ring member 13 is freely rotatably supported while being axially fixed, i.e., in directions parallel to the normal axis of the tire so that the tire engaging surface 13a thereof will remain substantially co-planar with the similarly axially fixed, rotatable, tire engaging surface 10a of inner ring member 10. A suitable annular plastic dust cover 16 may be secured to the fixed annular frame 12 so as to overlap the rotatable ring 13 to protect the bearings.

Figure 5:
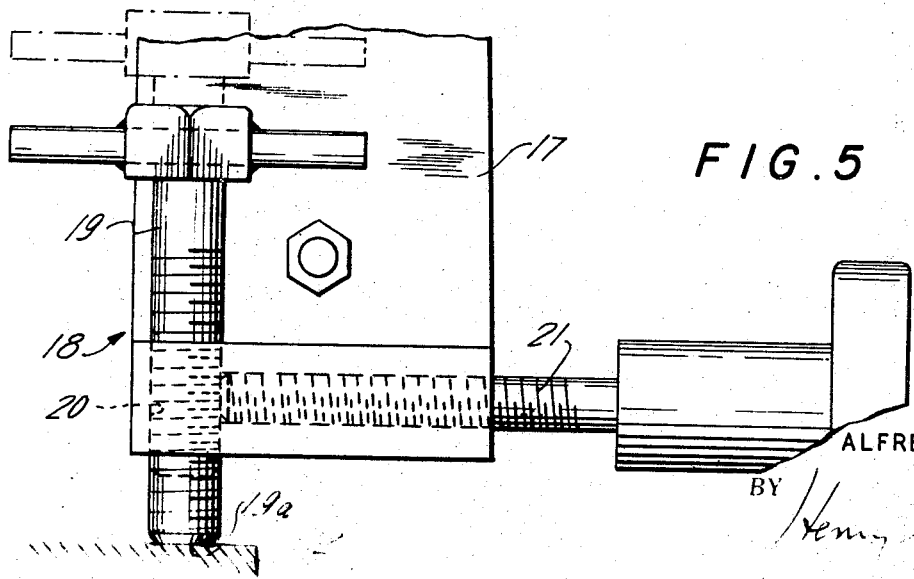
FIG. 5 is an enlarged partial view of the grinding wheel depth adjustment device shown in FIG. 1.

As is well known, the grinding wheels 6 and 6' may be mounted at the free ends respectively of pivotable arms 17 and 17' so as to move vertically with respect to the sidewall surface in response to pivotal movement of the arms 17, 17'. A grind depth-adjustment means 18 (FIG. 5) is provided in the form of an adjustable stop screw 19 suitably fixedly connected to the pivotable arm 17. A similar arrangement is provided on arm 17'. The adjustable screw 19 may be manually raised or lowered in the internally threaded bore 20 in which it is received and has a bottom surface 19a which bears against the top surface of annular frame member 12 when the respective grinding wheel 6, 6' reaches the desired depth of grind, thus preventing further vertical downward movement of the grinding wheel. A suitable lock member 21 may be provided for locking the adjustment screw 19 in any desired position of adjustment. The vertical movement of the grinding wheel is therefore accurately determined with respect to the co-planar surfaces 10a and 13a.

As previously noted, the inner ring member 10 is, in the illustrated embodiment, fixedly secured to the upper hub part 4a, so as to rotate therewith, while the outer ring member 13 is supported for free rotation by the annular frame member 12. The outer annular ring 13, therefore, rotates only in response to engagement thereof with a rotating tire T mounted in the apparatus.

In the preferred embodiment of the present invention a tire T is first placed on the lower chuck part 4b. This lower chuck part is then raised to a predetermined position with respect to the upper chuck member so that the beads of the tire T are held securely by the upper and lower supporting rims 4a and 4b respectively, and the tire is inflated, all substantially as taught by U.S. Pat. 3,128,579. As the tire T is inflated, it expands against, and is held against further expansion by, the surface portions 10a and 13a which face the sidewall of the tire T and which are located on inner and outer rings 10 and 13, respectively, whereby the portion of the tire sidewall intermediate the two rings is forced to lie in a given plane substantially perpendicular to the normal axis of the tire. In other words, the portion of the tire sidewall which is included between and bounded by the regions of the sidewall in engagement with the surfaces 10a and 13a will be held in a given plane. According to the present invention, therefore, the tire sidewall is engaged by locating means (10, 13) not only on one side of the portion to be ground, for example inwardly thereof as was the case in the prior art, but is engaged also at a spaced region of the tire sidewall on that side of the portion to be ground which is opposite to the first region of engagement. Where, for example, the portion to be ground is in the form of an annular stripe, the regions of the tire engaged by the locating means according to the present invention are both the region located immediately radially inwardly of the inner edge of the stripe and the region located immediately radially outwardly of the outer edge of the stripe.

In operation, a tire T positioned on the lower chuck part 4b is moved upwardly by such chuck part into the position illustrated in FIG. 2, with the beads thereof respectively engaging suitable flanges provided therefor on the upper and lower chuck parts. The tire T is then inflated with the inflation means described, these means constituting, with respect to the illustrated embodiment, the urging means herein. The inflating means, i.e. the urging means herein, urges portions of the upper sidewall of the tire T, mounted in the apparatus, into tight engagement with the surfaces 10a and 13a hereinbefore described. The inner ring member 10 and the outer ring member 13 have outer and inner radii, extending, respectively, near to but inwardly of, and near to but outwardly of, the sidewall portion to be ground namely—in the illustrated embodiment—the stripe. The rings 10 and 13, therefore, define between themselves an annular space which is in registry with the annular stripe to be ground on the sidewall. Urging of the aforesaid portions of the sidewall of the tire T into firm engagement with the tire engaging surface portions 10a and 13a, respectively, forces the stripe portion of the tire sidewall to assume a flat shape, with the surface thereof located substantially in the plane of the substantially co-planar surfaces 10a and 13a. But for the presence of rings 10 and 13, inflation of the tire would result in the sidewall stripe portion assuming a curved shape in cross section. The surfaces 10a and 13a, acting as they do on opposite sides of the region to be ground, prevent such curvature in the latter region.

It would, of course, be possible to mount the inner ring member 10 independently of the chuck 4 rather than fixed thereto. Thus, it would be possible to mount the inner ring member 10 also for free rotation similar to the outer ring member 13. In such construction it would further be possible to move the tire inwardly, together with its support means, i.e., the chuck parts 4a and 4b, after inflating the tire. The already inflated tire would thus be moved from a position beneath the pair of freely rotatable rings to a position in which spaced regions of the tire sidewall engage the surfaces 10a and 13a, respectively, so as to urge the intermediate stripe portion of the sidewall into the plane defined by such surfaces. It will be seen that in the latter construction the means for moving the tire supporting chuck upwardly together with the already inflated tire thereon, would constitute the urging means according to the present invention.

Since the distance from the normal axis to the sidewall stripe portion varies from tire to tire, depending both on style and size, the grinding wheel and its drive motor are mounted for movement generally radially inwardly and outwardly with respect to the chuck, as is well known in the art to accommodate such variation. Furthermore, the ring members 10 and 13 may be readily removed and replaced with comparable parts of different dimension so as to accommodate variations in sidewall grinding radius.

The grinding wheels 6, 6' at the free ends of pivot arms 17, 17' are initially in the lowermost position illustrated, as a result of their own and/or additional weights applied thereto in well known manner. When the grinding is to begin, the grinding wheels are in such lowered position with the adjustable stop screw 19 in contact with the upper surface of annular frame 12. When the elevated, inflated tire engages the grinding wheels, the partly balanced grinding assemblies are raised thereby and the adjustable stop screws 19 disengage the upper surface of annular frames 12. The coarse grinding wheel 6 immediately begins grinding the strip as the tire T rotates and completes the depth of rough grind when the stop screw 19 engages the surface of frame 12. It should be noted that the coarse grinding wheel 6 is powered initially while the fine-grinding wheel 6' is initially free-wheeling. This condition is reversed after coarse grinding is completed. The finish grinding then begins and the depth of grind is similarly controlled. As will be obvious, the grinding wheels move susbtantially vertically in response to pivotal movement of the arms 17 and 17', previously described. The upper limit of movement of the grinding wheels is not critical, but the lower limit, as determined by the adjustable stop screws 19, 19' is important because it determnies the extent to which the grinding wheels bear against the tire sidewall.

A substantial advantage of the apparatus according to the present invention is that the sidewall surface to be ground is maintained substantially in a plane which is perpendicular to the normal axis of rotation of the tire during the grinding operation and is firmly supported in such plane. This permits not only an accurate determination of the grind depth, but also results in a substantial reduction of vibratory and oscillatory forces on the grinding wheels since, by urging the sidewall portion to be ground into the aforesaid plane of the inner and outer ring surfaces 10a and 13a, respectively, there is provided, for the sidewall portion to be ground, a firm support which is fixed with respect to the tire, i.e., which rotates therewith. As a result, a much smoother ground surface is obtained with fewer rotations of the tire than are required with the presently known grinding apparatus.

It will be seen from the above that in accordance with the present invention the sidewall portion to be ground is held more rigidly and positioned more accurately than was possible with the devices known heretofore. In order to achieve the desired flatness and rigidity of the aforesaid tire sidewall portion, it is of course only necessary that this portion be located intermediate of and included between spaced regions of the tire sidewall which latter are engaged by spaced locating surface portions such as, for example, the surfaces 10a and 13a of the illustrated embodiment. Preferably, as previously noted, these spaced tire engaging surface portions are located on members which rotate with the tire. Where an annular stripe is to be ground the surface portion 10a preferably extends close to but inwardly of the inner edge of such stripe while the surface portion 13a preferably extends close to but outwardly of the outer edge of such stripe. Normally, particularly where thick grinding wheels are used, it is desirable to provide a greater radial spacing between the outer ring member 13 and the outer edge of the stripe than between the inner edge of the stripe and the outer edge of the inner ring 10. This is so because of the physical dimensions of the wheels which, it will be seen, require a greater minimum radial clearance with respect to the outer ring than with respect to the inner ring.

While there has been described herein a preferred embodiment of this invention, it will be obvious to those skilled in the art that various changes and modifications may be made therein without departing from the invention, and it is, therefore, intended to cover all such changes and modifications as fall within the true spirit and scope of the invention as defined by the appended claims.

Having thus described my invention, what I claim and desire to protect by Letters Patent is:

1. In an apparatus for precisely abrading a portion of a vehicular tire sidewall having a normal axis, in combination:

locating means having spaced locating surface portions adapted to engage spaced regions on the tire sidewall in close proximity to opposite edges of, and including therebetween, the portion to be abraded, said locating surface portions being situated substantially in a plane which is substantially perpendicular to the normal axis of the tire; and urging means for urging said tire sidewall and said locating means toward each other to shift said portion of the tire sidewall located therebetween substantially into said plane.

2. The apparatus according to claim 1 further comprising abrading means precisely positioned with respect to said locating surface portions of said locating means for abrading said portion of said sidewall while said portion is maintained substantially in said plane by said locating means.

3. The apparatus according to claim 1 wherein said locating means comprises an outer annular member having a substantially annular locating surface portion adapted to engage said tire sidewall in the region thereof which surrounds the portion to be abraded.

4. The apparatus according to claim 3 wherein the portion to be abraded is an annular stripe concentric with the normal axis of the tire, said locating means further comprising an inner annular member having an annular surface portion adapted to engage regions of the tire sidewall located radially inwardly of, and surrounded by the portion to be abraded, said surface portions of said inner and outer members constituting, respectively, said spaced locating surface portions of said locating means.

5. The apparatus according to claim 3 wherein said outer annular member is provided with first annular groove means being disposed at one side face of said outer annular member and second annular groove means disposed on the other side face of said outer annular member radially inwardly of said first annular groove means.

6. The apparatus according to claim 5 further comprising a pair of bearing means disposed in said pair of annular groove means, respectively, of said outer annular member, each of said bearing means comprising a plurality of circumferentially spaced spherical bearing members.

7. The apparatus according to claim 1, further comprising support means for supporting the beads of the tire thereon in fixed relation with respect to said locating means, said urging means comprising fluid pressure means communicating with the interior of said tire for expanding the latter to thereby shift said portion of the tire substantially into said plane in response to the admission of pressure fluid into the interior of the tire.

8. The apparatus according to claim 1, said locating means comprising inner and outer co-axial ring members having co-planar surface portions constituting, respectively, said spaced locating surface portions, said apparatus further comprising support means for supporting the tire thereon co-axially with respect to said ring members.

9. The apparatus according to claim 8, further comprising a frame means supporting said tire support means, said apparatus further comprising means carried by said frame means for freely rotatably supporting said outer ring member thereon.

10. The apparatus according to claim 9 wherein said means supporting said outer ring member comprises a pair of axially oppositely acting annular bearing means disposed co-axially with respect to said normal axis of the tire and arranged to prevent relative axial movement of said outer ring member with respect to said frame means while permitting free rotation of said outer ring member, said inner ring member being also axially fixed with respect to said frame means.

11. The apparatus according to claim 10 further comprising drive means operatively connected to said tire support means for rotating the latter together with the tire located thereon, said outer ring member rotating in response to rotation of the tire sidewall in engagement therewith, so as to assist in maintaining said portion to be abraded substantially in said plane during such rotation of the tire.

12. The apparatus according to claim 11, further comprising a grinding wheel mounted on said frame for rotation about an axis substantially normal to said normal axis of the tire and movable in directions substantially parallel to said normal axis toward and away from said portion to be abraded whereby said portion can be abraded to a precise depth with respect to the plane of said locating surface portions.

13. The apparatus according to claim 1, wherein the portion to be abraded is an annular stripe concentric with the normal axis of the tire, said locating means comprising: an inner annular ring member supported for rotation about said normal axis, said inner ring member having an annular surface portion constituting one of said locating surface portions and adapted to engage an annular ring member coaxially disposed with respect to said the inner edge of the stripe to be abraded; an outer annular ring member coaxially dispostd with respect to said inner ring member, said outer ring member having an annular surface portion constituting the other of said locating surface portions and adapted to engage an annular region of the tire sidewall near to and surrounding the outer edge of the stripe to be abraded; and means freely rotatably supporting said outer ring member in fixed axial relationship with respect to said inner ring member.

14. In apparatus for precisely abrading the sidewall of a pneumatic tire having a normal axis, in combination:

a tire chuck including a first part for engaging a bead of the tire and a second part for engaging the other bead of the tire, said first part having an annular flange extending outwardly therefrom and terminating in a plane substantially perpendicular to the normal axis of the tire near the inner edge of the portion to be abraded, and adapted to contact the tire between the bead associated with said first part and said inner edge; and an outer annular member supported for free rotation about said normal axis, said outer annular member having a surface portion located in said plane and adapted to contact the sidewall of the tire radially outwardly of and closely adjacent to the outer edge of the portion to be abraded.

15. The apparatus according to claim 14 further comprising: means for inflating the tire when the beads thereof are engaged by said first and second parts for urging said surface portions into contact with the tire respectively between the bead and the inner edge of the stripe and the tread and the outer edge of the stripe.

16. Apparatus according to claim 15 further comprising:

means for rotating said chuck on the normal axis of the tire;

a grinding wheel having a cylindrical edge with an axial width no greater than the width of the stripe; means mounting said grinding wheel for rotation about an axis normal to the axis of rotation of said chuck and said tire;

means for moving said grinding wheel generally parallel to the axis of said chuck and the tire; and adjustable stop means for limiting said parallel movement of said grinding wheel toward the tire sidewall surface.

17. In an apparatus for precisely abrading a contrasting stripe in the sidewall of a pneumatic tire, in combination:
frame means;
chuck means on said frame means for supporting the tire for rotation on its normal axis;
a pair of coaxial ring members mounted for rotation about said normal axis, said ring members including annular substantially co-planar radially spaced tire engaging surface portions located in a plane perpendicular to said normal axis, said radial spacing therebetween only slightly exceeding the width of the stripe to be ground, and said surface portions contacting the tire, when the latter is inflated, inwardly of the inner edge and outwardly of the outer edge, respectively, of the stripe to be ground; and
means on said frame means freely rotatably mounting the outermost one of said ring members;
said last mentioned means comprising an outer bearing means circumferentially disposed with respect to said outermost ring member in the region of the outer circumference of said ring on the side thereof which faces the tire sidewall, and an inner bearing means circumferentially disposed with respect to said outermost ring radially inwardly of said outer bearing means on the side thereof which faces away from the tire sidewall and said pair of bearing means adapted to act in opposite axial directions with respect to said outermost ring for maintaining said outermost ring in fixed axial position on said frame means.

18. In an apparatus for precisely abrading a contrasting stripe in the sidewall of a pneumatic tire having a normal axis and wherein the tire is mounted on a tire chuck having opposite chuck parts for engaging the opposite beads of the tire, one of said parts having an annular flange extending outwardly therefrom and terminating in a plane perpendicular to the normal axis of the tire near the inner edge of the stripe to be ground and adapted to contact the tire near such inner edge when the tire is inflated, said apparatus having means for inflating the tire, the improvement comprising an annular, coaxially disposed, substantially flat, ring member having opposite side faces, one of said faces being provided with an annular tire engaging surface portion adapted to engage regions of the tire sidewall closely adjacent to and surrounding the outer edge of the stripe to be ground, and means for freely rotatably supporting said ring member in axially fixed position with respect to said annular flange of said chuck, so that said tire engaging surfaces of both said chuck and said annular member are located in the same plane perpendicular to the normal axis of the tire.

19. In the process of precisely abrading a given portion of the sidewall of a tire the improvement comprising the steps of:
inflating the tire to cause outward expansion thereof;
restricting outward movement of spaced regions of the tire sidewall in close proximity to opposite edges of, and including therebetween, the portion to be abraded to maintain the portion to be abraded in a plane substantially perpendicular to the normal axis of the tire; and
abrading said portion while continuing to restrict movement of said regions of the tire sidewall to said plane substantially perpendicular to said normal axis.

20. The process according to claim 19 wherein the portion to be abraded is in the shape of a contrasting annular stripe, wherein said step of:
restricting the outward movement of said sidewall comprises restricting outward movement of regions of the sidewall of the tire located radially inwardly and radially outwardly of the stripe portion near to the inner and outer edges respectively of the stripe portion, to maintain the stripe portion in a plane substantially perpendicular to the normal axis of the tire.

21. The process according to claim 20, wherein said regions, the outward movement of which is restricted, are concentric annular portions of the tire sidewall adjacent to and respectively located on opposite sides of said stripe portion, said process further comprising rotating the tire on its normal axis for abrading said stripe portion of the tire while continuing to restrict movement of said concentric annular portions of the tire to the plane substantially perpendicular to the normal axis.

References Cited
UNITED STATES PATENTS 3,290,831 12/1966 Laube _____ 51—106
3,346,897 10/1967 Nelson _____ 51—274 X OTHELL M. SIMPSON, Primary Examiner U.S. Cl. X.R.
51—3, 274, 327

PO-1050
(5/69)

UNITED STATES PATENT OFFICE
CERTIFICATE OF CORRECTION

Patent No. 3,521,408     Dated July 21, 1970

Inventor(s)  Alfred H. Neugebauer

It is certified that error appears in the above-identified patent and that said Letters Patent are hereby corrected as shown below:

Claim 13, lines 29, 30 and 31 cancel in their entirety and substitute therefor:

--lar region of the tire sidewall near to and surrounded by the inner edge of the stripe to be abraded; an outer annular ring member coaxially disposed with respect to said--

SIGNED AND
SEALED
DEC 15 1970

(SEAL)
Attest:

Edward M. Fletcher, Jr.
Attesting Officer

WILLIAM E. SCHUYLER, JR.
Commissioner of Patents